United States Patent [19]
Tsai

[11] Patent Number: 5,524,920
[45] Date of Patent: Jun. 11, 1996

[54] BASE FRAME ASSEMBLY FOR SUITCASE TRUCKS

[76] Inventor: Cheng-Hsien Tsai, No. 103, Da-Ming 1st Rd., Tien-Tzu Hsiang, Taichung Hsein, Taiwan

[21] Appl. No.: 534,319

[22] Filed: Sep. 27, 1995

[51] Int. Cl.⁶ .................................................. B62B 1/00
[52] U.S. Cl. ........................ 280/652; 280/37; 280/651; 190/18 A
[58] Field of Search .................... 280/652, 35, 37, 280/651, 47.131, 47.24, 43.24, 654, 47.17, 47.18; 190/18 A

[56] References Cited

U.S. PATENT DOCUMENTS

| | | | |
|---|---|---|---|
| 4,261,447 | 4/1981 | Arias et al. | 190/18 A |
| 5,108,119 | 4/1992 | Huang | 190/18 A |
| 5,323,886 | 6/1994 | Chen | 190/18 A |
| 5,374,073 | 12/1994 | Hung-Hsin | 190/18 A |
| 5,431,262 | 7/1995 | Rekuc et al. | 190/18 A |
| 5,433,461 | 7/1995 | Chang | 280/37 |
| 5,452,778 | 9/1995 | Wang | 280/37 |

FOREIGN PATENT DOCUMENTS

| | | | |
|---|---|---|---|
| 4274965 | 9/1992 | Japan | 280/35 |
| 1676901 | 9/1991 | U.S.S.R. | 280/652 |

*Primary Examiner*—Margaret A. Focarino
*Assistant Examiner*—Min Yu
*Attorney, Agent, or Firm*—Bacon & Thomas

[57] ABSTRACT

A base frame assembly for suitcase trucks, including a base frame equipped with a pair of wheels and having two longitudinal sleeves; two first tubes respectively slidably coupled to the sleeves; two tubular stop members respectively fastened to the outer ends of the first tubes on the inside; two second tubes respectively slidably inserted through the tubular stop members into the first tubes, each second tube having an inner end fixedly mounted with a plug cap, which is stopped in place by one tubular stop member when the second tubes are extended out of the first tubes; two stands respectively fixed to the outer ends of the second tubes; and a transverse connecting bar connected between the stands.

3 Claims, 3 Drawing Sheets

BASE FRAME ASSEMBLY FOR SUITCASE TRUCKS

BACKGROUND OF THE INVENTION

The present invention relates to suitcase trucks, and relates more particularly to the base frame assembly of a suitcase truck which is comprised of a base frame equipped with wheels and having two parallel sleeves, two first tubes respectively slidably coupled to the sleeves, two second tubes respectively slidably coupled to the first tubes, two stands fixedly secured to the second tubes, and a transverse connecting bar connected between the stands.

Regular heavy duty suitcase trucks are commonly comprised of a metal frame that is not collapsible. There is also known a suitcase truck having a retractable handle that can be adjusted to the desired height. However, the holding space of the base frame of this structure of suitcase truck is still not adjustable subject to the volume of load carried thereon. Therefore, conventional suitcase trucks tend to overturn when a heavy load is carried thereon.

SUMMARY OF THE INVENTION

The present invention has been accomplished to provide a base frame assembly for suitcase trucks which eliminates the aforesaid drawbacks. According to one aspect of the present invention, the base frame assembly comprises a base frame equipped with a pair of wheels and having two longitudinal sleeves; two first tubes respectively slidably coupled to the sleeves; two tubular stop members respectively fastened to the outer ends of the first tubes on the inside; two second tubes respectively slidably inserted through the tubular stop members into the first tubes, each second tube having an inner end fixedly mounted with a plug cap, which is stopped in place by one tubular stop member when the second tubes are extended out of the first tubes. According to another aspect of the present invention, the base frame assembly further comprises two stands respectively fixed to the outer ends of the second tubes for supporting them on the ground stably. According to still another aspect of the present invention, the base frame assembly further comprises transverse connecting bar connected between the stands. Through the transverse connecting bar, the second tubes and the first tubes can be conveniently pulled out of the sleeves of the base frame from the retracted position to the extended position.

DETAILED DESCRIPTION OF THE PREFERRED EMBODIMENT

Figure 1:
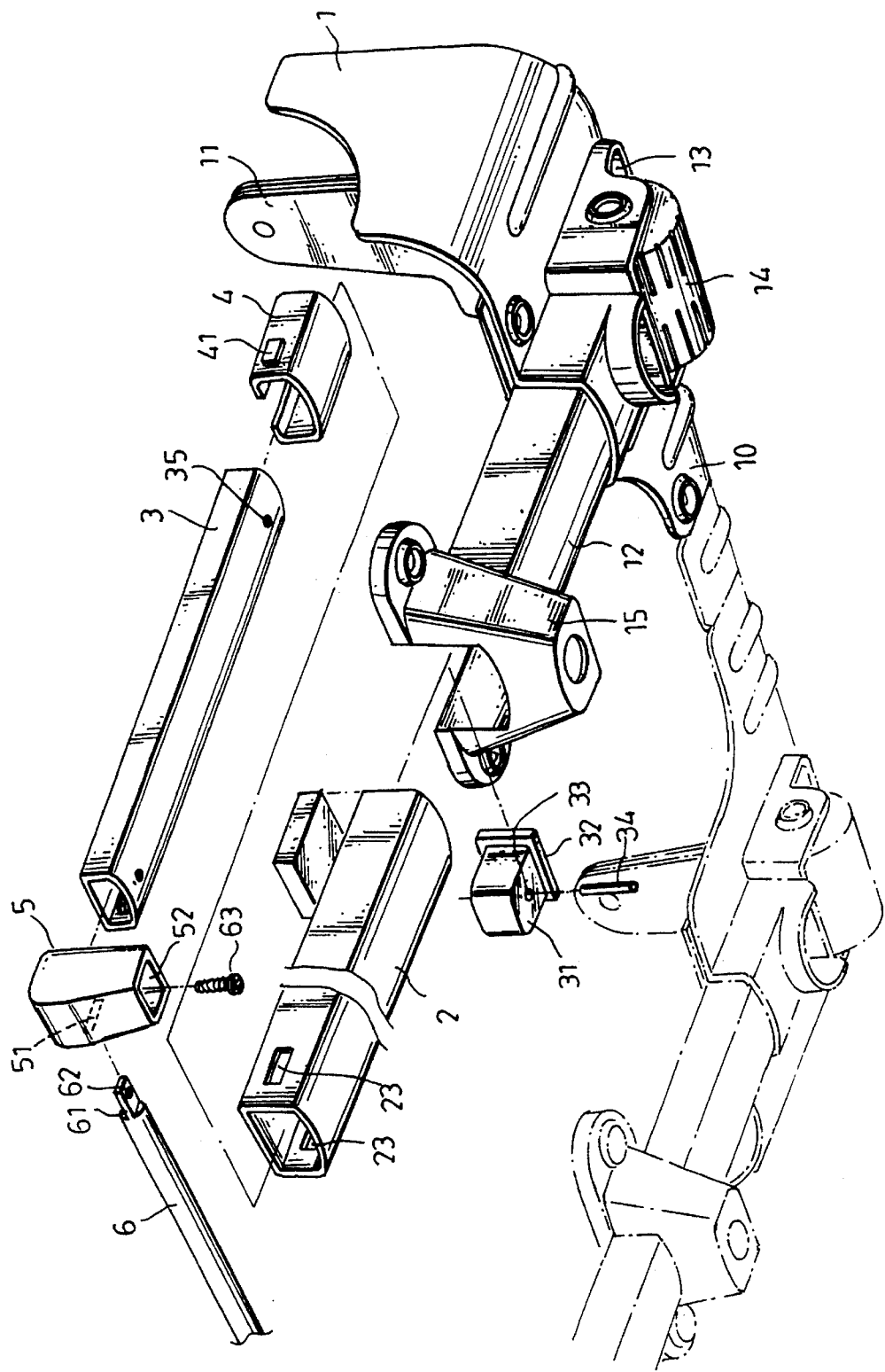
FIG. 1 is an exploded view of a base frame assembly according to the present invention.
Figure 4:
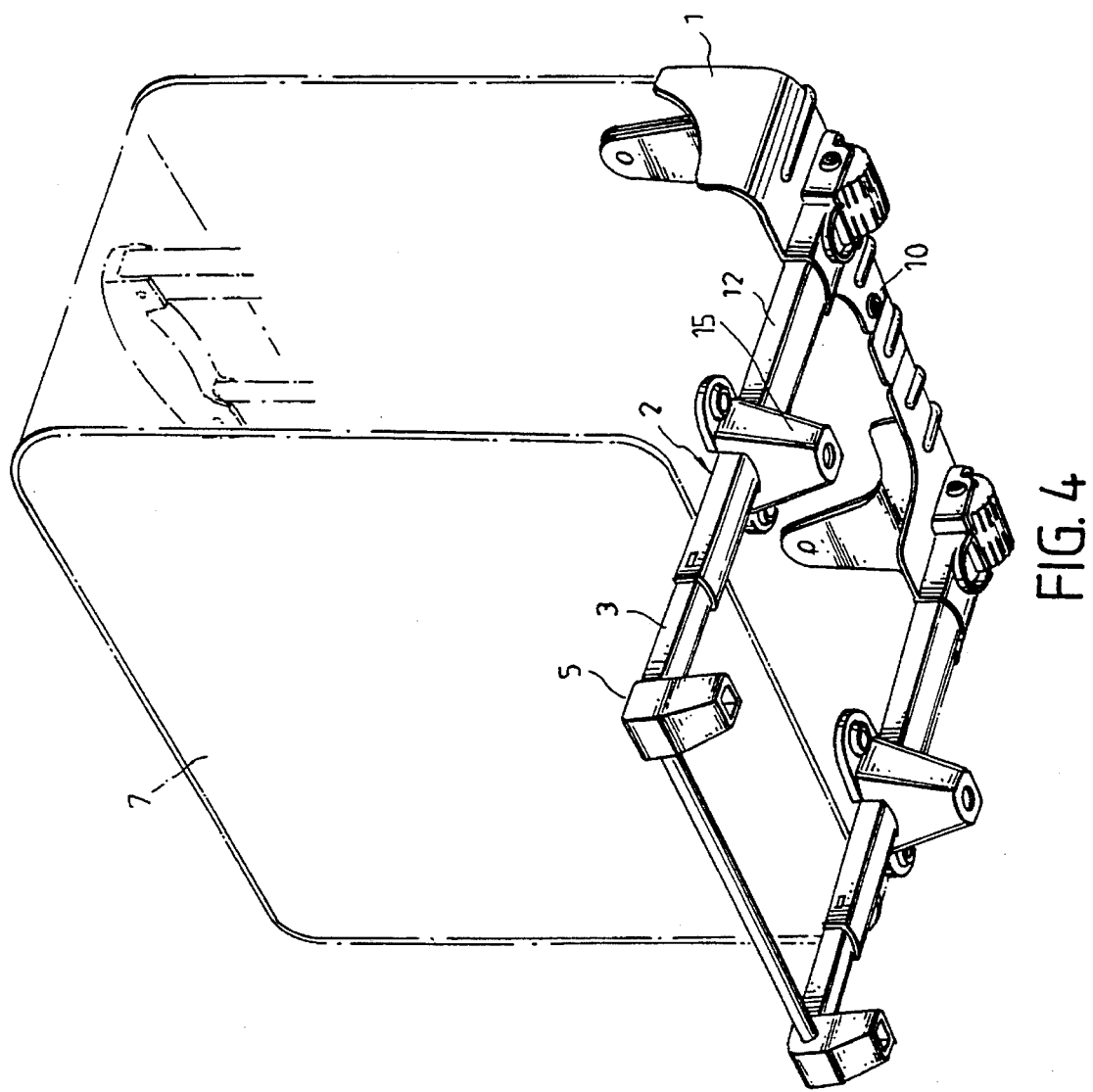
FIG. 4 is an elevational view of the base frame assembly shown in FIG. 1.

Referring to FIGS. 1 and 4, the base frame assembly in accordance with the present invention comprises a base frame 1, a pair of first tubes 2, a pair of second tubes 3, two tubular stop members 4, two stands 5, and a transverse connecting bar 6.

The base frame 1 is designed for carrying a suitcase 7, comprising a substantially U-shaped transverse bar 10, two upright boards 11 raised from two opposite ends of the U-shaped transverse bar 10 for fixing to the back side of the suitcase 7, two longitudinal sleeves 12 bilaterally perpendicularly extended from the U-shaped transverse bar 10 and disposed in a parallel relation, two locating blocks 15 respectively fixedly secured to the ends of the longitudinal sleeves 12, two wheel frames 13 fixedly secured to two opposite ends of the U-shaped transverse bar 10 at the bottom to hold a respective wheel 14. The first tubes 2 are slidably coupled to the locating blocks 15 and can be moved in and out of the sleeves 12 respectively. When the first tubes 2 are respectively flanged so that when they are stopped in place by the locating blocks 15 when they are moved out of the sleeves 12 (this structure can be easily achieved by ordinary skill, therefore it is neither illustrated in a separate drawing nor described in detail). The opposite end (remote from the base frame 1) of each of the first tubes 2 has two opposite side holes 23. Each of the second tubes 3 has one end mounted with a respective plug cap 31 and slidably inserted into one first tube 2, and an opposite end coupled to one stand 5. The plug cap 31 has a vertical pin hole 33 connected between two opposite mounting holes 35 at one end of the respective second tube 3 by a locating pin 34, and a head 32 stopped outside the respective second tube 3. The size of the head 32 is bigger than the outer diameter of the second tubes 3. The tubular stop members 4 are respectively mounted inside the first tubes 2 to hold the second tubes 3, each having two opposite projections 41 at two opposite sides respectively fitted into the side holes 23 of one first tube 2. The stands 5 are respectively fixed to the second tubes 3 at one end, each having a side slot 51 and a bottom hole 52. The transverse connecting bar 6 has two extension strips 61 at two opposite ends respectively inserted into the side slots 51 of the stands 5 and then fixed in place by a respective screw 63, which is inserted through the bottom hole 52 of the respective stand 5 and threaded into a screw hole 62 on the respective extension strip 61.

Figure 2:
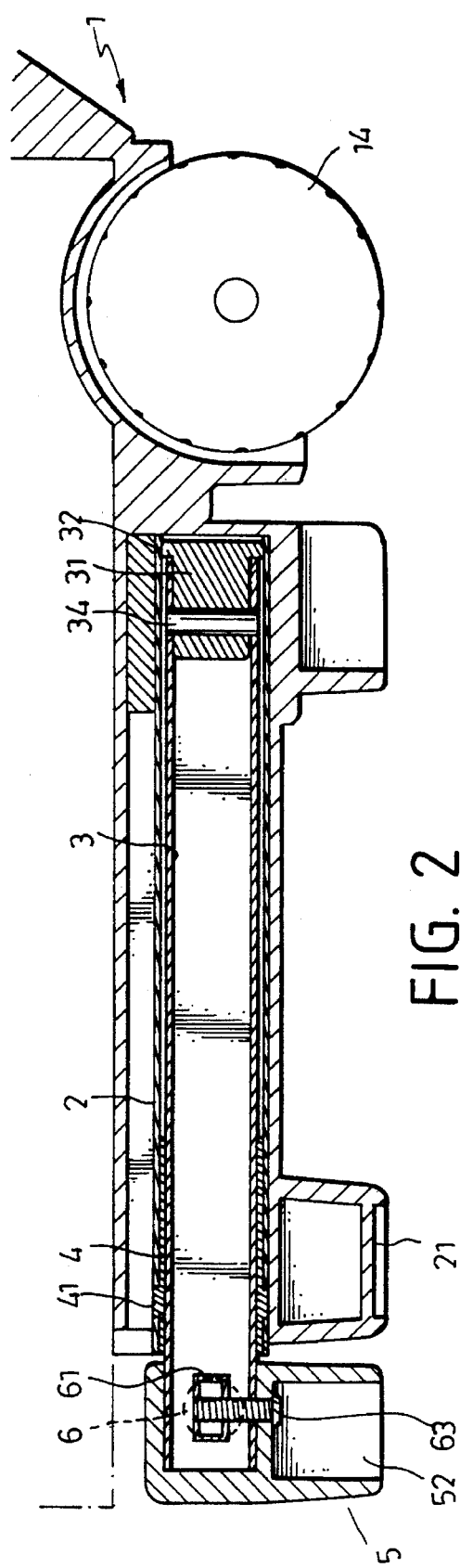
FIG. 2 is a side assembly view in section of the base frame assembly shown in FIG. 1, showing the first tubes and the second tubes retracted.
Figure 3:
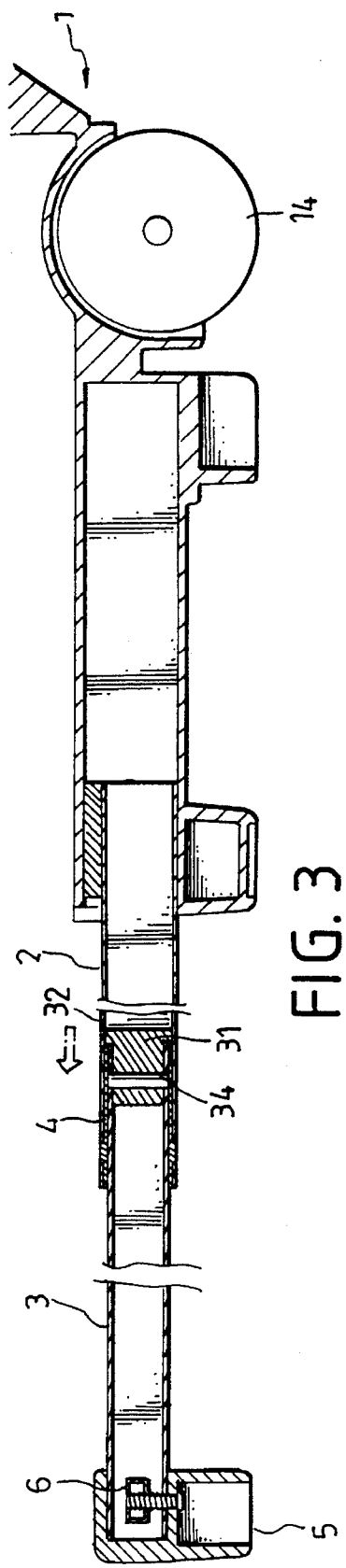
FIG. 3 is similar to FIG. 2 but showing the second tubes extended out of the first tubes, and the first tubes extended out of the sleeves.

Referring to FIGS. 2, 3, and 4, when the suitcase 7 is loaded onto the base frame 1, the upright boards 11 are respectively fixed to the back side of the suitcase 7, then the transverse connecting bar 6 is pulled outwards from the base frame 1. When the transverse connecting bar 6 is pulled outwards, the second tubes 3 are respectively carried by the transverse connecting bar 6 from a retracted position to an extended position. When the second tubes 3 are moved to the extended position, the heads 32 of the plug caps 31 are respectively stopped in place by the tubular stop members 4. When the transverse connecting bar 6 is continuously pulled outwards from the base frame 1, the first tubes 2 are carried by the second tubes 3 from a retracted position inside the sleeves 12 to an extended position outside the sleeves 12. When the base frame assembly is fully extended out, an extra loading space is defined above the first tubes 2, the second tubes 3, and the transverse connecting bar 6.

It is to be understood that the drawings are designed for purposes of illustration only, and are not intended as a definition of the limits and scope of the invention disclosed.

What is claimed is:

1. A base frame assembly for suitcase trucks, comprising a base frame having a substantially U-shaped transverse bar, two longitudinal sleeves bilaterally perpendicularly extended from said U-shaped transverse bar and disposed in horizontal in a parallel relation, and two wheel frames fixedly secured to two opposite ends of said U-shaped transverse bar at a bottom side to hold a respective wheel;

two first tubes respectively slidably coupled to said sleeves and moved between an extended position and a retracted position, each first tube having an inner end disposed inside the respective sleeve, an outer end disposed outside the respective sleeve, and two opposite side holes at said outer end;

two tubular stop members respectively fastened to the outer ends of said first tubes on the inside, each having two opposite projections respectively fitted into the side holes of the respective first tube;

two second tubes respectively inserted through said tubular stop members into said first tubes and moved between an extended position and a retracted position, each second tube having an inner end fixedly mounted with a respective plug cap and disposed inside the respective first tube, and an outer end disposed outside the respective first tube, the plug caps of said second tubes being respectively stopped in place by said tubular stop members when said second tubes are moved to the extended position;

two stands respectively fixed to the outer ends of said second tubes, each stand having a side slot and a bottom hole in communication with said side slot; and a transverse connecting bar connected between said stands, said transverse connecting bar having two opposite ends respectively fastened to the side slots of said stands.

2. The base frame assembly of claim 1 wherein said base frame has two upright boards raised from two opposite ends of said U-shaped transverse bar for fixing to the back side of a suitcase carried thereon.

3. The base frame assembly of claim 1 wherein said plug cap has a vertical pin hole connected between two opposite mounting holes at the inner end of the respective second tube by a locating pin, and a head stopped outside the respective second tube, the size of said head being bigger than the outer diameter of said second tubes.

* * * * *